United States Patent [19]
Wagner et al.

[11] Patent Number: 6,123,369
[45] Date of Patent: Sep. 26, 2000

[54] PIPE LAP JOINT AND METHODS

[75] Inventors: Wayne M. Wagner, Apple Valley; John T. Herman, Dellwood; Michael J. Protas, Crystal, all of Minn.

[73] Assignee: Donaldson Company, Inc., Minneapolis, Minn.

[21] Appl. No.: 09/204,140

[22] Filed: Dec. 2, 1998

[51] Int. Cl.⁷ ...................................................... F16L 55/00
[52] U.S. Cl. ............................................ 285/424; 285/322
[58] Field of Search .................................. 285/322, 235, 285/286, 424

[56] References Cited

U.S. PATENT DOCUMENTS

| | | |
|---|---|---|
| Re. 30,042 | 7/1979 | Hiemstra et al. . |
| 3,348,629 | 10/1967 | Cassel . |
| 3,508,770 | 4/1970 | Cassel . |
| 3,525,419 | 8/1970 | Cassel . |
| 3,572,778 | 3/1971 | Cassel . |
| 3,574,358 | 4/1971 | Cassel . |
| 3,645,357 | 2/1972 | Cassel . |
| 3,653,696 | 4/1972 | Cassel . |
| 3,730,293 | 5/1973 | Cassel . |
| 3,827,733 | 8/1974 | Cassel . |
| 3,863,964 | 2/1975 | Cassel . |
| 3,905,623 | 9/1975 | Cassel . |
| 3,944,265 | 3/1976 | Hiemstra et al. . |
| 4,056,273 | 11/1977 | Cassel . |
| 4,113,289 | 9/1978 | Wagner et al. . |
| 4,142,743 | 3/1979 | McGowen et al. . |
| 4,261,600 | 4/1981 | Cassel . |
| 4,270,689 | 6/1981 | Canfield . |
| 4,312,526 | 1/1982 | Cassel . |
| 4,466,642 | 8/1984 | Tonchen . |
| 4,536,019 | 8/1985 | Quaranta .................................. 285/322 |
| 4,558,891 | 12/1985 | Wagner et al. . |
| 4,609,213 | 9/1986 | Tonchen . |
| 4,623,164 | 11/1986 | Cassel et al. . |
| 4,629,226 | 12/1986 | Cassel et al. . |
| 4,660,862 | 4/1987 | Cassel et al. . |
| 4,790,574 | 12/1988 | Wagner et al. . |
| 4,813,720 | 3/1989 | Cassel . |
| 5,116,083 | 5/1992 | Gillingham et al. . |
| 5,310,158 | 5/1994 | Cassel . |
| 5,588,680 | 12/1996 | Cassel et al. . |
| 5,632,513 | 5/1997 | Cassel . |
| 5,924,282 | 7/1999 | Thomas ................................... 285/322 |

*Primary Examiner*—Lynne H. Browne
*Assistant Examiner*—Aaron Dunwoody
*Attorney, Agent, or Firm*—Merchant & Gould P.C.

[57] ABSTRACT

A lap joint includes an outer, flexible, cylindrical tube; an inner, solid, cylindrical pipe; and a securing device for compressing the flexible tube around the pipe for securing the flexible tube to the pipe and for providing a substantially leak-free connection between the flexible tube and the pipe. The flexible tube has first and second ends and a first diameter. The flexible tube includes a plurality of captured slots punched through the flexible tube at least at the first end. The plurality of captured slots have a first plurality of metal deformations to prevent circumferential slippage of the flexible tube and are disposed annularly around the flexible tube. Each of the plurality of captured slots are inboard of the first end and do not extend to the first end. The securing device is arranged and configured to completely cover the plurality of captured slots. The flexible tube also includes a plurality of relief slots punched through the flexible tube at least at the first end. The plurality of relief slots have a second plurality of metal deformations to prevent circumferential slippage of the flexible tube and are disposed annularly around the flexible tube. Each of the plurality of relief slots extends to the first end and extends a first distance inboard of the captured slots. Each of the plurality of relief slots is offset a second distance from the relief slots. The solid pipe has first and second ends. The first end has a second diameter less than the first diameter of the flexible tube. The first end is arranged and configured to telescopically slide within the first end of the flexible tube.

26 Claims, 4 Drawing Sheets

PIPE LAP JOINT AND METHODS

FIELD OF THE INVENTION

The disclosure describes pipe couplings. In particular, the disclosure describes a pipe lap joint for joining two pipe sections in vehicle exhaust systems and methods therefore.

BACKGROUND OF THE INVENTION

Most vehicle exhaust systems provide a conduit for exhaust gas to pass from the point of combustion to a remote outlet, passing through a series of treatment devices such as a muffler, catalytic converter, and resonator. Each component is connected by a number of lengths and shapes of piping. In some applications, joining pipes are connected by a lap joint, wherein succeeding pipes of smaller diameter are fitted telescopically into preceding pipes of larger diameter and clamped in the region where the pipes overlap. Pipe clamps are tightened down to crimp or compress the outer tube onto the inner tube.

In order to produce a safe, noise-free exhaust system, the lap joint must be substantially leak-proof and prevent the pipes from separating over time. Typical pipe connections have leaks or allow relative movement between the pipes; therefore, improvements in pipe joint connections are desirable.

SUMMARY OF THE INVENTION

In one aspect of the present invention, one example embodiment involves a lap joint that includes an outer, flexible, cylindrical tube; an inner, solid, cylindrical pipe; and a securing device for compressing the flexible tube around the pipe for securing the flexible tube to the pipe and for providing a substantially leak-free connection between the flexible tube and the pipe. The flexible tube has first and second ends and a first diameter. The flexible tube includes a plurality of captured slots punched through the flexible tube at least at the first end. The plurality of captured slots have a first plurality of metal deformations to prevent circumferential slippage of the flexible tube and are disposed annularly around the flexible tube. Each of the plurality of captured slots are inboard of the first end and do not extend to the first end. The securing device is arranged and configured to completely cover the plurality of captured slots.

The flexible tube also includes a plurality of relief slots punched through the flexible tube at least at the first end. The plurality of relief slots have a second plurality of metal deformations to prevent circumferential slippage of the flexible tube and are disposed annularly around the flexible tube. Each of the plurality of relief slots extends to the first end and extends a first distance inboard of the captured slots. Each of the plurality of relief slots is offset a second distance from the relief slots.

The solid pipe has first and second ends. The first end has a second diameter less than the first diameter of the flexible tube. The first end is arranged and configured to telescopically slide within the first end of the flexible tube.

In another aspect of the present disclosure, a method of manufacturing a cylindrical, flexible, tube is disclosed. The method includes winding a single, continuous, helical strip to form a plurality of convolutions that have an interlock seam between adjacent convolutions; punching a plurality of captured slots through at least a first end of the flexible tube, creating a first plurality of metal deformations; and punching a plurality of relief slots through at least the first end of the flexible tube, creating a second plurality of metal deformations. The first and second plurality of metal deformations prevent circumferential slippage and maintain the integrity of the flexible tube.

In another aspect of the present disclosure, a method of assembling a pipe coupling is disclosed. The method includes cutting a flexible tube to a desired length; placing the flexible tube in approximately a half compressed condition after punching a plurality of slots through the flexible tube; applying a compression indicator to the flexible tube in the half compressed condition; placing a solid pipe telescopically inside the flexible tube; and securing the flexible tube to the solid pipe with a clamp.

DETAILED DESCRIPTION

A. Some Problems with Conventional Arrangements.

Several lap joint configurations have been previously disclosed. For example, U.S. Pat. No. 4,113,289 to Wagner et al. discloses the use of captured slots and relief slots around the circumference of a solid pipe. The slots allow the pipe to be compressed and the relief slots prevent the end of the pipe from buckling.

In U.S. Pat. No. 5,632,513 (hereinafter '513) to Cassel, the use of captured slots in flexible tubing is disclosed. Flexible tubing typically comprises a single continuous helical strip that is wound to form multiple convolutions with an interlock seam between adjacent convolutions, allowing the flexible tube to flex. The '513 patent discloses that the use of captured slots is advantageous because it allows circumferential slippage of adjacent convolutions between the captured slots. As the flexible tube is compressed, the convolutions between the captured slots move to reduce the diameter of the flexible tube. However, there are disadvantages associated with circumferential slippage, such as an inconsistent diameter or adjacent convolutions becoming disjoined; therefore, improvements in pipe lap joints for use with flexible tubing are desirable.

B. FIGS. 1–6

In general, a pipe coupling includes an outer pipe and an inner pipe connected by a pipe clamp. Typically, at least a portion of the outer pipe has a slightly larger diameter than at least a portion of the inner pipe such that it extends telescopically over the inner pipe. The pipe clamp encircles the outer pipe in the region where it overlaps the inner pipe. The pipe clamp is tightened to compress the outer pipe around the inner pipe, securing the outer pipe to the inner pipe.

In the preferred embodiment, the pipe coupling also includes a sealing system. The sealing system is preferably designed to substantially minimize leaks between the outer pipe and the inner pipe and to minimize relative movement between the outer pipe and the inner pipe. Minimizing relative movement between the pipes reduces the possibility that the pipes will separate over time.

Figure 1:
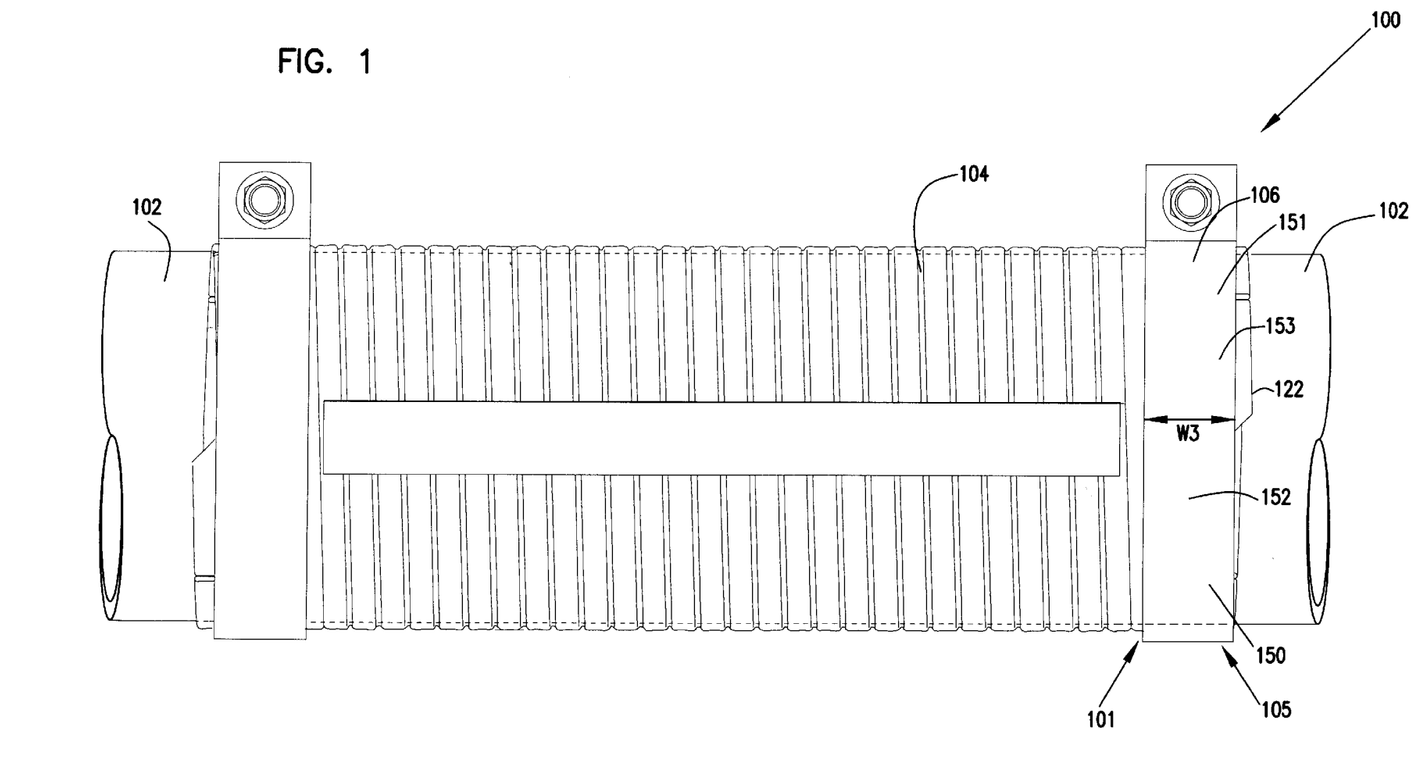
FIG. 1 is a schematic, side elevational view of a pipe coupling, according to an example embodiment of the present invention.

Turning now to the drawings, attention is directed to FIG. 1, which generally illustrates a pipe coupling 100 having a sealing system 101. In the preferred embodiment, the pipe coupling 100 includes a solid pipe 102, a flexible hose or tube 104, and the sealing system 101.

Figure 2:
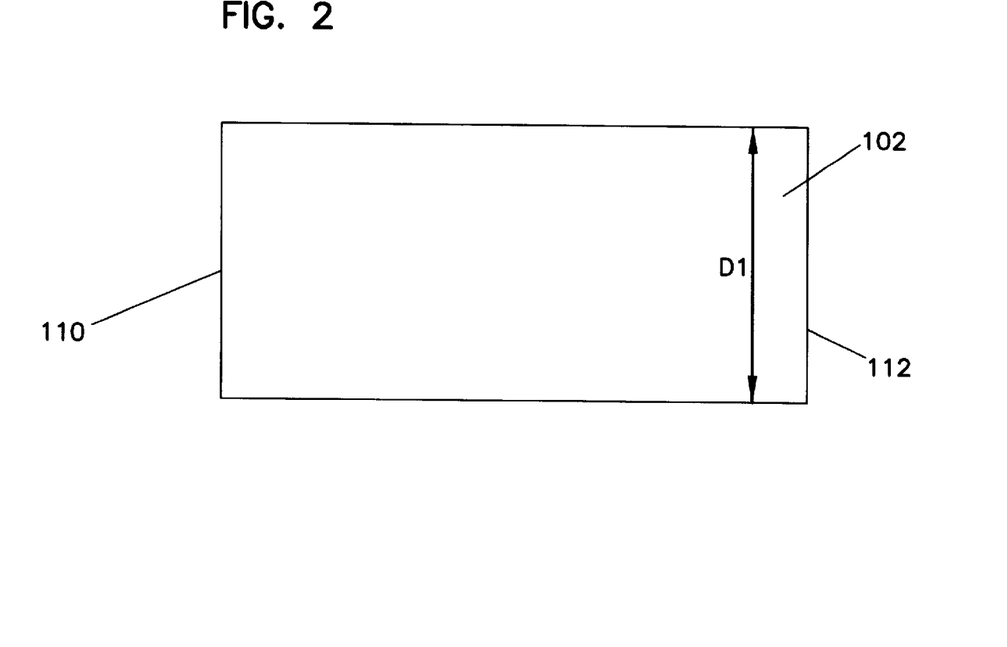
FIG. 2 is a schematic, side elevational view of a pipe of the pipe coupling of FIG. 1, according to an example embodiment of the present invention.

Attention is directed to FIG. 2, which illustrates an example embodiment of the solid pipe 102. The solid pipe 102 may be any pipe, for example, an exhaust pipe on a truck exhaust system assembly. Preferably, the solid pipe 102 is generally cylindrical and has first and second ends 110, 112. Preferably, the solid pipe 102 has at least a portion that has a slightly smaller diameter than the flexible tube 104, such that at least a portion of the solid pipe 102 is slidable into at least a portion of the flexible tube 104.

In the preferred embodiment, the solid pipe 102 has a first diameter D1. Preferably, the first diameter D1 of the solid pipe 102 is between 3.5 inches (8.9 cm) and 6 inches (15.2 cm), and typically, the first diameter D1 is 5 inches (12.7 cm). Preferably, the solid pipe 102 is comprised of a metal, such as aluminized steel or chrome plated steel. Of course, the solid pipe 102 may be any size desired and comprised of any suitable material.

Figure 3:
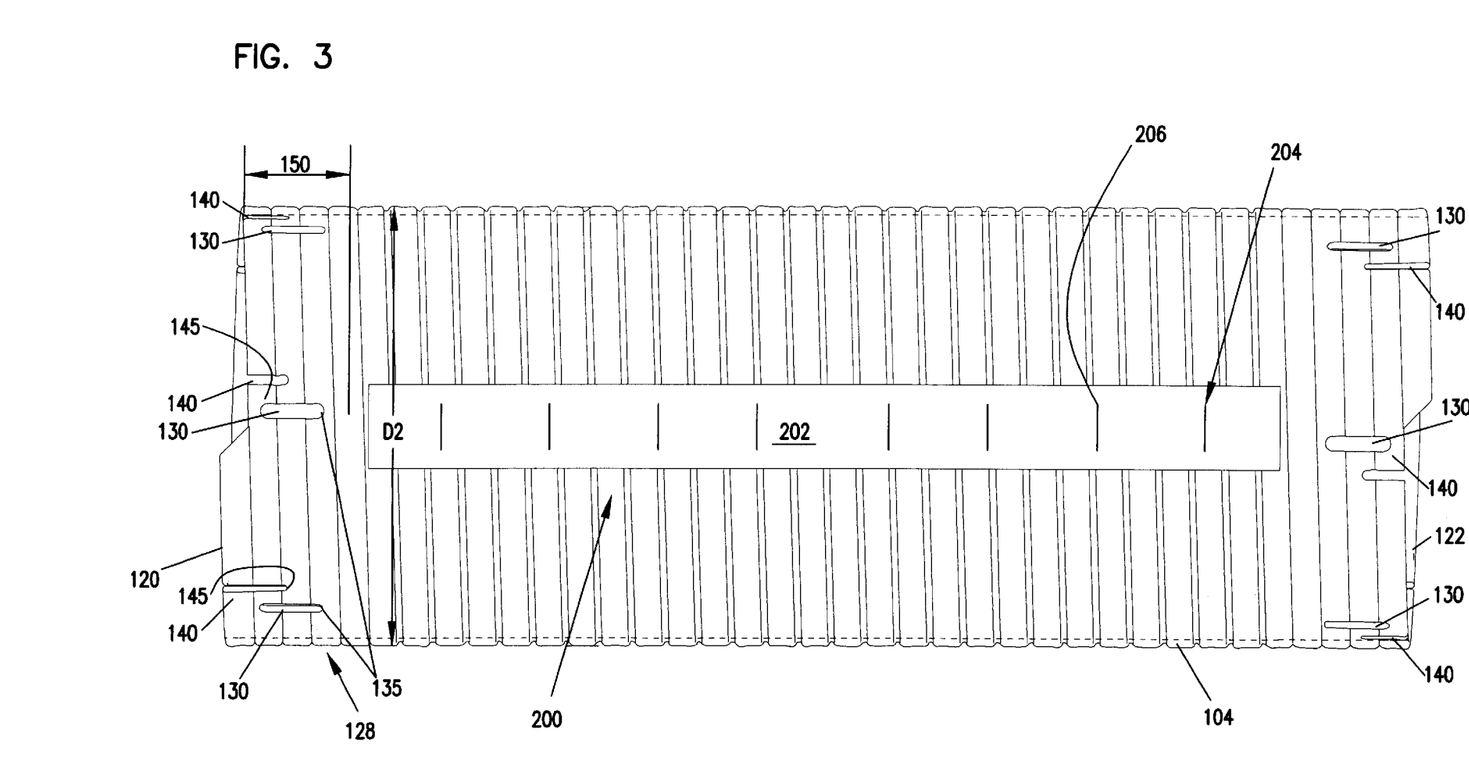
FIG. 3 is a schematic, side elevational view of another pipe of the pipe coupling of FIG. 1, according to an example embodiment of the present invention.

Attention is directed to FIG. 3, which illustrates an example embodiment of the flexible tube 104. The flexible tube 104 may be any flexible tubing, for example, flexible, metal tubing used to connect a solid pipe to an individual component of a vehicle exhaust system, such as a muffler. Preferably, the flexible tube 104 is generally cylindrical and has first and second ends 120, 122. Typically, the flexible tube 104 comprises a single continuous helical strip that is wound to form multiple convolutions with an interlock seam between adjacent convolutions, allowing the flexible tube 104 to flex. By the term "flex," it is meant that the flexible tube 104 bends and is non-rigid. Flexible tubes such as this are commonly known.

In the preferred embodiment, a second diameter D2 of the flexible tube 104 at the first end 120 is equal to the second diameter D2 of the flexible tube 104 at the second end 122. In other words, preferably, the flexible tube 104 has a constant second diameter D2 throughout its axial length. Preferably, the second diameter D2 of the flexible tube 104 is between 3.5 inches (8.9 cm) and 6 inches (15.2 cm), and typically, the second diameter D2 is 5 inches (12.7 cm). Preferably, the second diameter D2 of the flexible tube 104 is slightly greater than the first diameter D1 (FIG. 2) of the solid pipe 102 (FIG. 2) and allows for an assembly tolerance of approximately 0.03 inches (0.8 mm). Preferably, the flexible tube 104 is comprised of a metal, such as stainless steel. Of course, the flexible tube 104 may be any size desired and comprised of any suitable material.

Still in reference to FIG. 3, generally, the sealing system 101 (FIG. 1) includes a compressible system 128 in the flexible tube 104. The compressible system 128 is arranged and configured to allow the flexible tube 104 to be compressed tightly around the solid pipe 102 without buckling, minimizing leaks between the flexible tube 104 and the solid pipe 102 and minimizing relative movement between the flexible tube 104 and the solid pipe 102.

In particular, the compressible system 128 includes compression slots. In the preferred embodiment, the compressible system 128 includes a plurality of captured slots, generally represented at 130, and a plurality of relief slots, generally represented at 140. In particular, the captured slots 130 are elongated and are disposed annularly around the cylindrical wall of the flexible tube 104. Preferably, the captured slots 130 are positioned approximately equidistant from each other. By the term "captured," it is meant that the captured slots 130 do not extend to an end, such as the first end 120 of the flexible tube 104, but are positioned inboard of the first end 120 as illustrated. The captured slots 130 generally extend parallel to a longitudinal axis of the flexible tube 104.

Figure 4:
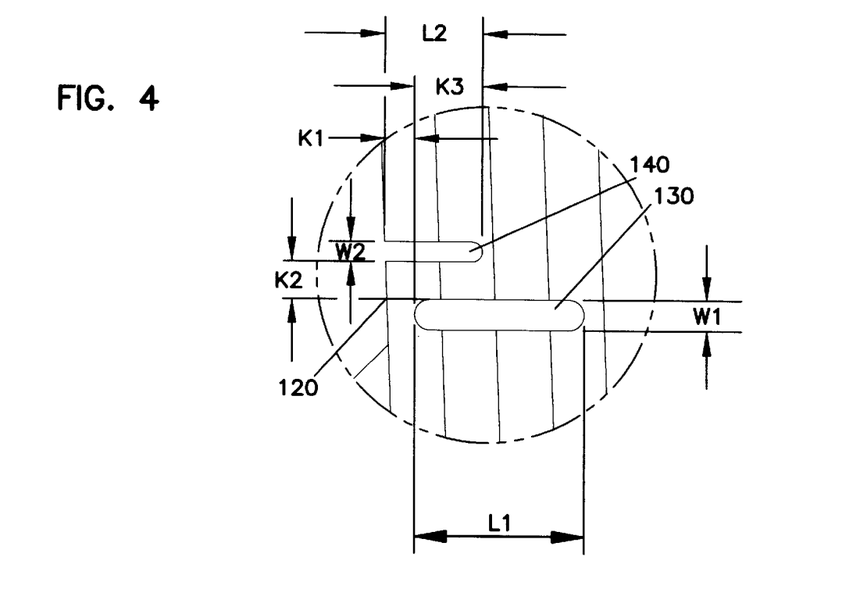
FIG. 4 is an enlarged, schematic, partial side elevational view of the pipe of FIG. 3, according to an example embodiment of the present invention.

Attention is directed to FIG. 4, which is an enlarged view of the captured slots 130. In the preferred embodiment, the captured slots 130 end a first distance K1 from the first end 120 of the flexible tube 104. Because the flexible tube 104 is helical, the first distance K1 varies but typically is between 0.1 inches (2.5 mm) and 0.3 inches (7.6 mm). The captured slots 130 have a first length L1. Preferably, the first length L1 is between 0.5 inches (1.3 cm) and 1.5 inches (3.8 cm), and typically the first length L1 is 1 inch (2.5 cm). The captured slots 130 also have a first width W1. Preferably, the first width W1 is between 0.1 inches (2.5 mm) and 0.3 inches (7.6 mm), and typically the first width W1 is 0.19 inches (4.8 mm). Referring back to FIG. 3, in the preferred embodiment, the inboard ends 135 of the captured slots 130 are radially aligned.

The relief slots 140 are also elongated and are disposed annularly around the cylindrical wall of the flexible tube 104. Preferably, the relief slots 140 are positioned approximately equidistant from each other. The relief slots 140 are not captured, since they extend through the end, such as the first end 120 of the flexible tube 104. Referring back to FIG. 4, the relief slots 140 have a second length L2 extending from the first end 120 of the flexible tube 104 inboard toward the captured slot 130. Because the flexible tube 104 is helical, the second length L2 varies but typically is between 0.2 inches (5.1 mm) and 1 inch (2.5 cm). The relief slots 140 also have a second width W2. Preferably, the second width is between 0.05 inches (1.3 mm) and 0.2 inches (5.1 mm), and typically is 0.12 inches (3 mm). Referring back to FIG. 3, in the preferred embodiment, the inboard ends 145 of the relief slots 140 are radially aligned.

In the preferred embodiment, the relief slots 140 are generally parallel to the captured slots 130. Preferably, the relief slots 140 are offset radially a second distance K2 from the captured slots 130. Preferably, the second distance K2 is between 0.1 inches (2.5 mm) and 1 inch (2.54 cm), and typically is 0.38 inches (9.7 mm). Preferably, the relief slots 140 overlap the captured slots 130. By the term "overlap," it is meant that the relief slots 140 extend a third distance K3 inboard of the captured slots 130 as illustrated in FIG. 3. Preferably, the third distance K3 is between 0.1 inches (2.5 mm) and 0.5 inches (1.3 mm), and typically is 0.38 inches (9.7 mm). This overlapping between the captured slots 130 and the relief slots 140 has significant advantages. Greater compression of the flexible tube 140 is achieved, creating a substantially leak-proof seal and preventing relative movement at the joint.

In the preferred embodiment, the captured slots 130 and the relief slots 140 are punched through the flexible tube 104. This punching process causes metal deformations or burrs (not shown) on the edges of the captured slots 130 and the relief slots 140. The metal deformations prevent circumferential slippage in the flexible tube 104. Preventing circumferential slippage has significant advantages. Circumferential slippage is the relative slippage between adjacent convolutions of the flexible tube 104. This relative slippage distorts the second diameter D2 of the flexible tube 104. Circumferential slippage at the ends of the flexible tube 104, where the relief slots 140 are located, allows the ends of the flexible tube 104 to detach from the rest of the flexible tube 140. Thus, preventing circumferential slippage maintains the integrity of the flexible tube 104.

The first and second ends 120, 122 of the flexible tube 104 are arranged and configured to receive a pipe, such as the solid pipe 102 of FIG. 2, for securing the solid pipe 102 to the flexible tube 104. Referring back to FIG. 1, typically, the first end 110 (FIG. 2) of the solid pipe 102 is slid telescopically into the second end 122 of the flexible tube 104, creating an overlap region 150. By the term "overlap region," it is meant the area where the solid pipe 102 extends into the flexible tube 104 slightly beyond the inboard ends 135 of the captured slots 130.

Figure 5:
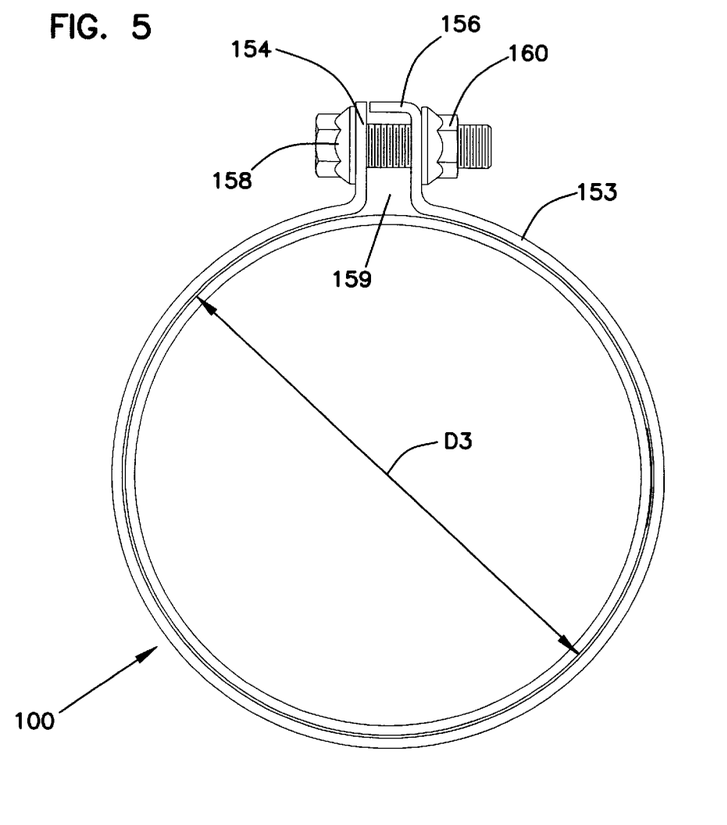
FIG. 5 is a schematic, end view of the pipe coupling of FIG. 1, according to an example embodiment of the present invention.

The sealing system 101 also includes a securing device 151. In the preferred embodiment, the securing device 151 is a pipe clamp 153. The pipe clamp 153 is of a type commonly known. Attention is directed to FIG. 5, which is an end view of the pipe coupling 100 of FIG. 1. The pipe clamp 153 has a third diameter D3. Preferably, the third diameter D3 is approximately greater than the second diameter D2 of the flexible tube 104 by the thickness of the flexible tube 104 times two and an assembly tolerance of approximately 0.03 inches (0.8 mm). The pipe clamp 153 is positioned around the flexible tube 104 at the second end 122 (FIG. 3) in the overlap region 150 (FIG. 1).

The pipe clamp 153 is designed to completely cover the captured slots 130 (FIG. 3) positioned annularly around the flexible tube 104. Referring back to FIG. 1, the pipe clamp 153 has a third width W3. In the preferred embodiment, the third width W3 of the pipe clamp 153 is sufficient to completely cover the captured slots 130 as illustrated. Preferably, the third width W3 of the pipe clamp 153 is at least 1.1 times as wide as the first width W1 (FIG. 4) of the captured slots 130. Preferably, the third width W3 is between 0.1 inches (2.5 mm) and 1.5 inches (3.8 cm), and typically is 1.25 inches (3.2 cm).

Referring back to FIG. 5, the pipe clamp 153 includes bolting ears 154, 156, through which a bolt 158 passes. The pipe clamp 153 has a gap 159 between the bolting ears 154, 156. Preferably, the pipe clamp 153 is positioned around the flexible tube 104 such that none of the captured slots 130 (FIG. 3) are positioned at the gap 159 between the bolting ears 154, 156. A nut 160 is attached to the end of the bolt 158. Tightening the nut 160 onto the bolt 158 compresses the third diameter D3 of the pipe clamp 153.

Referring now to FIGS. 1, 3, and 5, as the pipe clamp 153 (FIG. 1) is compressed, the flexible tube 104 (FIG. 1) under the pipe clamp 153 is also compressed. By the term "compressed," it is meant that the second diameter D2 (FIG. 3) of the flexible tube 104 under the pipe clamp 153, in the area of the captured slots 130 (FIG. 3), is radially collapsed or decreased to provide tight engagement between the solid pipe 102 (FIG. 1) and the flexible tube 104. Sufficient torque is applied to the nut 160 (FIG. 5) and bolt 158 (FIG. 5) to compress the flexible tube 104. As the flexible tube 104 is compressed, the second diameter D2 of the flexible tube 104 is decreased in the region under the pipe clamp 153. The captured slots 130 allow the second diameter D2 of the flexible tube 104 in the overlap region 150 (FIG. 1) to decrease without buckling. In addition, the captured slots 130 allow the flexible tube 104 to be compressed to form a tight fit between the solid pipe 102 and the flexible tube 104. By the term "tight fit," it is meant that the friction between the flexible tube 104 and the solid pipe 102 secures the solid pipe 102 within the flexible tube 104.

As the pipe clamp 153 (FIG. 1) is tightened and the flexible tube 104 (FIG. 1) is compressed, the relief slots 140 (FIG. 3) keep the second end 122 (FIG. 1) of the flexible tube 104 from buckling. The relief slots 140 also aid in the compression of the flexible tube 104. Because the sealing system 101 (FIG. 1) has both captured slots 130 (FIG. 3) and relief slots 140, greater compression can be achieved without distorting the integrity of the flexible tube 104. Greater compression prevents leaks and prevents relative movement between the solid pipe 102 (FIG. 1) and the flexible tube 104.

During use of the pipe coupling 100 (FIG. 1), gases may attempt to escape the flexible tube 104 through the captured slots 130 (FIG. 3). Because the pipe clamp 153 (FIG. 1) completely covers the captured slots 130, the gases are prevented from escaping the pipe coupling 100 by the pipe clamp 153. In the preferred embodiment, the relief slots 140 (FIG. 3) do not extend beyond halfway to the inboard end of the captured slots 130. This is advantageous because it prevents gases from escaping through the relief slots 140, which are not completely covered by the pipe clamp 153.

In alternative embodiments, the pipe clamp 153 (FIG. 1) may be spot-welded at one point to the flexible tube 104 (FIG. 1) to ensure that the pipe clamp 153 is correctly positioned over the captured slots 130 (FIG. 3) and to provide a modular assembly.

Figure 6:
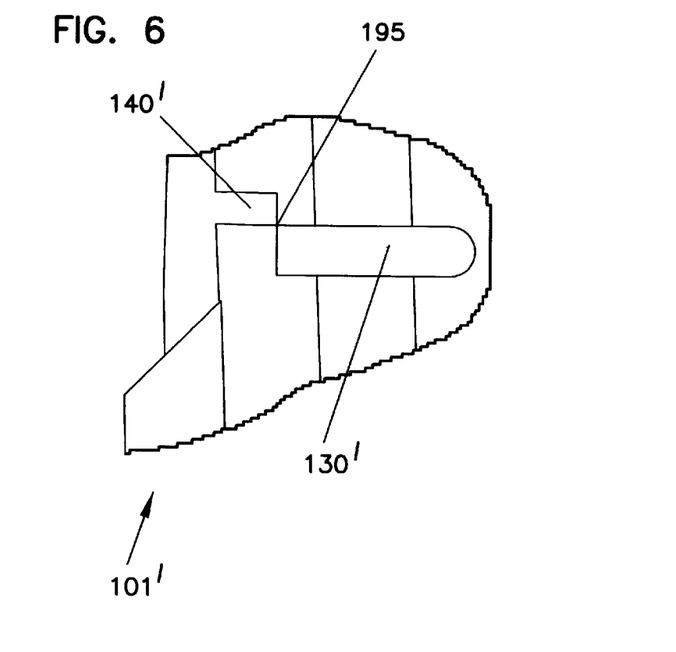
FIG. 6 is an enlarged, schematic, partial side elevational view of a pipe, according to another example embodiment of the present invention.

Attention is directed to FIG. 6, which is an enlarged, schematic view of the flexible tube 104 of FIG. 3 according to an alternative embodiment. In this embodiment, the relief slots 140' and the captured slots 130' are in touching engagement with each other. By the term "touching engagement," it is meant that the slots 140', 130' are axially and circumferentially adjacent at one corner 195. With this exception, the sealing system 101' of this embodiment is analogous to the sealing system 101 of FIG. 1.

Referring back to FIG. 3, the flexible tube 104 is axially compressible and expandable. By compressing and expanding, the flexible tube 104 is able to flex. Typically, to provide optimal flexing, the flexible tube 104 is installed in a half compressed state. In this state, the flexible tube 104 is able to expand or contract. In the preferred embodiment, the flexible tube 104 is fully compressed in the overlap area 150 (FIG. 1). In the fully compressed state, the flexible tube 104 is at its strongest. By fully compressing the overlap area 150, the lap joint is stronger under the clamp.

It is important that during installation, the flexible tube 104 be installed in the half compressed state between the clamps to allow optimal flexing. As such, preferably the flexible tube 104 includes a compression indicator device 200. The compression indicator device 200 gives a user or installer an indication of relative compression of the flexible tube 104. It is to be understood that the compression indicator device 200 may be used independent of the sealing system 101 of FIG. 1.

In the preferred embodiment, the compression indicator device 200 comprises a piece of tape 202, such as masking tape. After manufacturing of the flexible tube 104, the flexible tube 104 is placed in a half compressed state. The tape 202 is placed on the flexible tube 104 while the flexible tube 104 is in the half compressed state. During installation, if the tape 202 is wrinkled, it indicates to the user that the flexible tube 104 is compressed. The flexible tube 104 can be expanded to unwrinkle the tape 202. If the tape 202 is ripped, it indicates to the user that the flexible tube 104 is expanded beyond the half compressed condition. The flexible tube 104 can then be compressed to the condition where the ripped ends of the tape 202 are in touching engagement.

In an alternative embodiment, the compression indicator device 200 has length indicators 204. In the preferred embodiment, the length indicators 204 are marks 206 of inches or centimeters on the tape 202. The marks 206 enable the user to easily determine a length of the flexible tube 104.

It will be understood that a wide variety of specific configurations and applications are feasible, using techniques described herein. The dimensions described herein are typical examples. The ranges are preferred because they have been satisfactory to perform the job, without resulting in a structure larger or more expensive than necessary. Although ranges outside of these dimensions are contemplated, the dimensions described herein are convenient and typical.

The above specification, examples and data provide a complete description of the manufacture and use of the invention. Many embodiments of the invention can be made without departing from the spirit and scope of the invention.

We claim:

1. A lap joint comprising:
    (a) an outer, flexible, cylindrical tube having first and second ends and a first diameter, the flexible tube including:
        (i) a plurality of captured slots punched through the flexible tube at least at the first end;
            (A) the plurality of captured slots having a first plurality of metal deformations to prevent circumferential slippage of the flexible tube;
            (B) the plurality of captured slots being disposed annularly around the flexible tube;
            (C) each of the plurality of captured slots being inboard of the first end and not extending to the first end;
        (ii) a plurality of relief slots punched through the flexible tube at least at the first end;
            (A) the plurality of relief slots having a second plurality of metal deformations to prevent circumferential slippage of the flexible tube;
            (B) the plurality of relief slots being disposed annularly around the flexible tube;
            (C) each of the plurality of relief slots extending to the first end and extending a first distance inboard of the captured slots;
            (D) each of the plurality of relief slots being offset a second distance from the relief slots;
    (b) an inner, solid, cylindrical pipe having first and second ends;
        (i) the first end of the pipe having a second diameter less than the first diameter of the flexible tube;
        (ii) the first end of the pipe being arranged and configured to telescopically slide within the first end of the flexible tube;
    (c) a securing device for compressing the flexible tube around the pipe for securing the flexible tube to the pipe and for providing a substantially leak-free connection between the flexible tube and the pipe, the securing device arranged and configured to completely cover the plurality of captured slots; and
    (d) a compression indicator for indicating the relative compression of the flexible tube.

2. A lap joint according to claim 1, wherein the plurality of relief slots are parallel to the plurality of captured slots.

3. A lap joint according to claim 2, wherein the plurality of captured slots are positioned equidistant from each other, and the plurality of relief slots are positioned equidistant from each other.

4. A lap joint according to claim 1, wherein the securing device is a pipe clamp.

5. A lap joint according to claim 1, wherein the pipe and flexible tube are comprised of metal.

6. A lap joint according to claim 1, wherein the compression indicator includes length markers.

7. A lap joint according to claim 6, wherein the compression indicator comprises a piece of tape.

8. A lap joint comprising:
    (a) an outer, flexible, cylindrical tube having first and second ends and a first diameter, the flexible tube including:
        (i) a plurality of captured slots punched through the flexible tube at least at the first end;
            (A) the plurality of captured slots having a first plurality of metal deformations to prevent circumferential slippage of the flexible tube;
            (B) the plurality of captured slots being disposed annularly around the flexible tube;
            (C) each of the plurality of captured slots being inboard of the first end and not extending to the first end;
            (D) each of the plurality of captured slots being positioned equidistant from each other;
        (ii) a plurality of relief slots punched through the flexible tube at least at the first end;
            (A) the plurality of relief slots having a second plurality of metal deformations to prevent circumferential slippage of the flexible tube;
            (B) the plurality of relief slots being disposed annularly around the flexible tube;
            (C) each of the plurality of relief slots extending to the first end and extending a first distance inboard of the captured slots; (1) the first distance being at least 0.1 inches (2.5 mm);
            (D) each of the plurality of relief slots being offset a second distance from the relief slots;
            (E) the plurality of relief slots being parallel to the plurality of captured slots;
            (F) the plurality of relief slots being positioned equidistant from each other;
    (b) an inner, solid, cylindrical pipe having first and second ends;
        (i) the first end of the pipe having a second diameter less than the first diameter of the flexible tube;
        (ii) the first end of the pipe being arranged and configured to telescopically slide within the first end of the flexible tube; and
    (c) a securing device for compressing the flexible tube around the pipe for securing the flexible tube to the pipe and for providing a substantially leak-free connection between the flexible tube and the pipe, the securing device arranged and configured to completely cover the plurality of captured slots.

9. A lap joint according to claim 8, wherein the second distance is at least 0.1 inches (2.5 mm).

10. A lap joint according to claim 9, wherein the captured slots have a length between 0.5 inches (1.3 cm) and 1.5 inches (3.8 cm) and a width between 0.1 inches (2.5 mm) and 0.3 inches (7.6 mm).

11. A lap joint according to claim 10, wherein the relief slots have a length between 0.2 inches (5.1 mm) and 1 inch (2.5 cm) and a width between 0.05 inches (1.3 mm) and 0.2 inches (5.1 mm).

12. A lap joint according to claim 11, wherein the first diameter is between 3.5 inches (8.9 cm) and 6 inches (15.2 cm).

13. A lap joint according to claim 12, wherein the second diameter is between 3.5 inches (8.9 cm) and 6 inches (15.2 cm).

14. A lap joint comprising:
 (a) an outer, flexible, cylindrical tube having first and second ends and a first diameter, the flexible tube including:
  (i) a plurality of captured slots punched through the flexible tube at least at the first end;
   (A) the plurality of captured slots having a first plurality of metal deformations to prevent circumferential slippage of the flexible tube;
   (B) the plurality of captured slots being disposed annularly around the flexible tube;
   (C) each of the plurality of captured slots being inboard of the first end and not extending to the first end;
  (ii) a plurality of relief slots punched through the flexible tube at least at the first end;
   (A) the plurality of relief slots having a second plurality of metal deformations to prevent circumferential slippage of the flexible tube;
   (B) the plurality of relief slots being disposed annularly around the flexible tube;
   (C) each of the plurality of relief slots extending to the first end and extending a first distance inboard of the captured slots;
   (D) each of the plurality of relief slots being offset a second distance from the relief slots;
 (b) an inner, solid, cylindrical pipe having first and second ends;
  (i) the first end of the pipe having a second diameter less than the first diameter of the flexible tube;
  (ii) the first end of the pipe being arranged and configured to telescopically slide within the first end of the flexible tube; and
 (c) a securing device for compressing the flexible tube around the pipe for securing the flexible tube to the pipe and for providing a substantially leak-free connection between the flexible tube and the pipe, the securing device arranged and configured to completely cover the plurality of captured slots;
  (i) the securing device being a pipe clamp having a width at least 1.1 times a width of the plurality of captured slots.

15. A lap joint according to claim 14, wherein the plurality of relief slots are parallel to the plurality of captured slots.

16. A lap joint according to claim 14, wherein the plurality of captured slots are positioned equidistant from each other, and the plurality of relief slots are positioned equidistant from each other.

17. A lap joint according to claim 14, wherein the first distance is at least 0.1 inches (2.5 mm).

18. A lap joint according to claim 14, wherein the second distance is at least 0.1 inches (2.5 mm).

19. A lap joint comprising:
 (a) an outer, flexible, cylindrical tube having first and second ends and a first diameter, the flexible tube including:
  (i) a plurality of captured slots punched through the flexible tube at least at the first end;
   (A) the plurality of captured slots having a first plurality of metal deformations to prevent circumferential slippage of the flexible tube;
   (B) the plurality of captured slots being disposed annularly around the flexible tube;
   (C) each of the plurality of captured slots being inboard of the first end and not extending to the first end;
  (ii) a plurality of relief slots punched through the flexible tube at least at the first end;
   (A) the plurality of relief slots having a second plurality of metal deformations to prevent circumferential slippage of the flexible tube;
   (B) the plurality of relief slots being disposed annularly around the flexible tube;
   (C) each of the plurality of relief slots extending to the first end and extending a first distance inboard of the captured slots;
   (D) each of the plurality of relief slots being offset a second distance from the relief slots;
   (E) each of the plurality of relief slots being in touching engagement with the plurality of captured slots;
 (b) an inner, solid, cylindrical pipe having first and second ends;
  (i) the first end of the pipe having a second diameter less than the first diameter of the flexible tube;
  (ii) the first end of the pipe being arranged and configured to telescopically slide within the first end of the flexible tube; and
 (c) a securing device for compressing the flexible tube around the pipe for securing the flexible tube to the pipe and for providing a substantially leak-free connection between the flexible tube and the pipe, the securing device arranged and configured to completely cover the plurality of captured slots.

20. A lap joint according to claim 19, wherein the plurality of relief slots are parallel to the plurality of captured slots.

21. A lap joint according to claim 19, wherein the plurality of captured slots are positioned equidistant from each other, and the plurality of relief slots are positioned equidistant from each other.

22. A lap joint according to claim 19, wherein the first distance is at least 0.1 inches (2.5 mm).

23. A lap joint according to claim 19, wherein the second distance is at least 0.1 inches (2.5 mm).

24. A lap joint according to claim 19, wherein the securing device is a pipe clamp.

25. A lap joint according to claim 24, wherein the pipe clamp has a width at least 1.1 times a width of the plurality of captured slots.

26. A lap joint according to claim 19 wherein the pipe and flexible tube each comprise metal.

* * * * *

UNITED STATES PATENT AND TRADEMARK OFFICE
CERTIFICATE OF CORRECTION

| | | |
|---|---|---|
| PATENT NO. | : 6,123,369 | |
| APPLICATION NO. | : 09/204140 | |
| DATED | : September 26, 2000 | |
| INVENTOR(S) | : Wagner et al. | |

It is certified that error appears in the above-identified patent and that said Letters Patent is hereby corrected as shown below:

Title page should be deleted and substitute therefor the attached title page.

Fig. 1: Numbers 105, 106 and 152 on the top side of the drawing should be deleted as indicated in red. See corrected Fig. 1 in the attached copies.

Fig. 3: Numbers 140 and 145 have now been corrected so that the lead lines are such that they do point to the correct slots (indicated in red). See corrected Fig. 3 in the attached copies.

Fig. 5: Number 104 has been added as a reference number to Fig. 5 as indicated in red. See corrected Fig. 5 in the attached copies.

Signed and Sealed this

Sixth Day of May, 2008

JON W. DUDAS
*Director of the United States Patent and Trademark Office*

United States Patent [19]
Wagner et al.

[11] Patent Number: 6,123,369
[45] Date of Patent: Sep. 26, 2000

[54] PIPE LAP JOINT AND METHODS

[75] Inventors: Wayne M. Wagner, Apple Valley; John T. Herman, Dellwood; Michael J. Protas, Crystal, all of Minn.

[73] Assignee: Donaldson Company, Inc., Minneapolis, Minn.

[21] Appl. No.: 09/204,140

[22] Filed: Dec. 2, 1998

[51] Int. Cl.$^7$ ........................... F16L 55/00
[52] U.S. Cl. ........................... 285/424; 285/322
[58] Field of Search ........................... 285/322, 235, 285/236, 424

[56] References Cited

U.S. PATENT DOCUMENTS

| | | |
|---|---|---|
| Re. 30,042 | 7/1979 | Hiemstra et al. . |
| 3,348,529 | 10/1967 | Cassel . |
| 3,508,770 | 4/1970 | Cassel . |
| 3,525,419 | 8/1970 | Cassel . |
| 3,572,778 | 3/1971 | Cassel . |
| 3,574,358 | 4/1971 | Cassel . |
| 3,645,357 | 2/1972 | Cassel . |
| 3,653,696 | 4/1972 | Cassel . |
| 3,730,293 | 5/1973 | Cassel . |
| 3,827,733 | 8/1974 | Cassel . |
| 3,863,964 | 2/1975 | Cassel . |
| 3,905,623 | 9/1975 | Cassel . |
| 3,944,265 | 3/1976 | Hiemstra et al. . |
| 4,056,273 | 11/1977 | Cassel . |
| 4,113,289 | 9/1978 | Wagner et al. . |
| 4,142,743 | 3/1979 | McGowen et al. . |
| 4,261,600 | 4/1981 | Cassel . |
| 4,270,689 | 6/1981 | Canfield . |
| 4,312,526 | 1/1982 | Cassel . |
| 4,456,642 | 8/1984 | Tonchen . |
| 4,536,019 | 8/1985 | Quaranta ........................... 285/322 |
| 4,558,891 | 12/1985 | Wagner et al. . |
| 4,609,213 | 9/1986 | Tonchen . |
| 4,623,164 | 11/1986 | Cassel et al. . |
| 4,629,226 | 12/1986 | Cassel et al. . |
| 4,660,862 | 4/1987 | Cassel et al. . |
| 4,790,574 | 12/1988 | Wagner et al. . |
| 4,813,720 | 3/1989 | Cassel . |
| 5,116,083 | 5/1992 | Gillingham et al. . |
| 5,310,158 | 5/1994 | Cassel . |
| 5,588,680 | 12/1996 | Cassel et al. . |
| 5,632,513 | 5/1997 | Cassel . |
| 5,924,282 | 7/1999 | Thomas ........................... 285/322 |

*Primary Examiner*—Lynne H. Browne
*Assistant Examiner*—Aaron Dunwoody
*Attorney, Agent, or Firm*—Merchant & Gould P.C.

[57] ABSTRACT

A lap joint includes an outer, flexible, cylindrical tube; an inner, solid, cylindrical pipe; and a securing device for compressing the flexible tube around the pipe for securing the flexible tube to the pipe and for providing a substantially leak-free connection between the flexible tube and the pipe. The flexible tube has first and second ends and a first diameter. The flexible tube includes a plurality of captured slots punched through the flexible tube at least at the first end. The plurality of captured slots have a first plurality of metal deformations to prevent circumferential slippage of the flexible tube and are disposed annularly around the flexible tube. Each of the plurality of captured slots are inboard of the first end and do not extend to the first end. The securing device is arranged and configured to completely cover the plurality of captured slots. The flexible tube also includes a plurality of relief slots punched through the flexible tube at least at the first end. The plurality of relief slots have a second plurality of metal deformations to prevent circumferential slippage of the flexible tube and are disposed annularly around the flexible tube. Each of the plurality of relief slots extends to the first end and extends a first distance inboard of the captured slots. Each of the plurality of relief slots is offset a second distance from the relief slots. The solid pipe has first and second ends. The first end has a second diameter less than the first diameter of the flexible tube. The first end is arranged and configured to telescopically slide within the first end of the flexible tube.

26 Claims, 4 Drawing Sheets